Nov. 7, 1967 — A. S. ROBINSON — 3,351,452
APPARATUS FOR SUPPORTING A RIBBON OF GLASS ON A MOLTEN METAL BATH WITH GLASS RIBBON HEEL FLOW MEANS
Filed Nov. 4, 1963 — 3 Sheets-Sheet 1

Albert Sidney Robinson
Inventor

By Morrison, Kennedy & Campbell
Attorneys

Nov. 7, 1967  A. S. ROBINSON  3,351,452
APPARATUS FOR SUPPORTING A RIBBON OF GLASS ON A MOLTEN METAL
BATH WITH GLASS RIBBON HEEL FLOW MEANS
Filed Nov. 4, 1963  3 Sheets-Sheet 3

United States Patent Office 3,351,452
Patented Nov. 7, 1967

3,351,452
APPARATUS FOR SUPPORTING A RIBBON OF
GLASS ON A MOLTEN METAL BATH WITH
GLASS RIBBON HEEL FLOW MEANS
Albert Sidney Robinson, Birkdale, Southport, England,
assignor to Pilkington Brothers Limited, Liverpool,
England, a corporation of Great Britain
Filed Nov. 4, 1963, Ser. No. 321,005
Claims priority, application Great Britain, Nov. 9, 1962,
42,506/62
11 Claims. (Cl. 65—182)

ABSTRACT OF THE DISCLOSURE

Apparatus for forming glass in ribbon form with an overhanging heel-forming flow means for causing greater mass flow in one area of the flow than in other areas by a spout having a concave floor, heating means in the selected portion of the floor, and/or a concave tweel, and/or with a heel-dividing means extending forwardly toward the flow.

Figure 1:
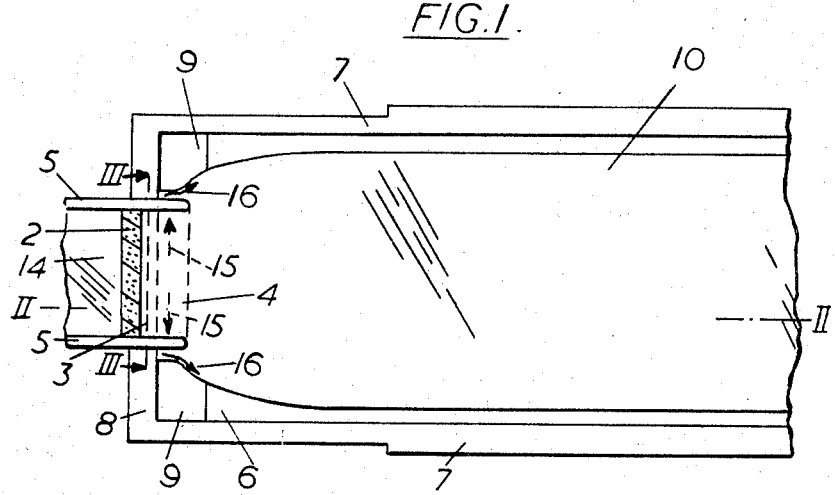

This invention relates to the manufacture of flat glass, and in particular to the manufacture of flat glass in ribbon form on a bath of molten metal.

In the manufacture of flat glass in ribbon form on a bath of molten metal, for example, molten tin or tin olloy in which tin predominates, molten glass is delivered to the bath at a controlled rate and the glass is advanced along the bath in ribbon form. In one method the molten glass which is delivered to the bath is permitted to flow in a direction reverse to the direction of advancement of the glass along the bath so that this reverse flow of the glass protects the surface of the bath behind the point of delivery of the molten glass from any access of air through the inlet to the bath. This reverse flow of the molten glass behind the point of delivery of the molten glass is known as a "heel" of molten glass and is particularly useful when the molten glass is delivered to the bath by means of a free fall.

In some circumstances of operation of such a process there is insufficient replacement of the glass in the heel by fresh molten glass and in particular there tends to be a central zone in which there is no movement of the glass. Such a zone of molten glass which is not replaced is known as a stagnant zone and if such a stagnant zone does occur, then it is liable to give rise to undesirable effects in the ribbon of glass formed on the bath of molten metal.

It is the main object of the present invention to provide an improved method of manufacturing flat glass in ribbon form on a bath of molten metal by causing the molten glass in the heel to be continuously replaced by molten glass newly delivered to the bath so that molten glass is not maintained in a stagnant condition in the heel.

Accordingly the present invention provides in the manufacture of flat glass in ribbon form during which the glass is advanced along a bath of molten metal, delivering molten glass at a controlled rate to the bath of molten metal and advancing the molten glass along the bath in ribbon form, permitting the molten glass delivered to the bath to flow in a direction away from the direction of advance of the ribbon of glass to form a heel, and enforcing on the molten glass in said heel a displacement which causes continuously a sufficient escape of molten glass from the heel to avoid the establishment of a stagnant zone in the heel of molten glass.

According to one feature, the present invention provides in the manufacture of flat glass in ribbon form during which the glass is advanced along a bath of molten metal, delivering molten glass at a controlled rate to the bath of molten metal and advancing the molten glass along the bath in ribbon form, permitting the molten glass delivered to the bath to flow in a direction away from the direction of advance of the ribbon of glass to form a heel, enforcing on the molten glass in said heel a displacement in a direction transverse to the direction of advancement of the glass ribbon along the bath and permitting continuously a sufficient escape of molten glass from the heel to avoid the establishment of a stagnant zone in the heel of molten glass.

Advantageously the transverse displacement of the molten glass in the heel is such as to engender a continuous lateral flow of the molten glass in the heel in a direction substantially at right angles to the direction of advancement of the glass ribbon along the bath.

According to this feature of the invention, therefore, the enforced transverse displacement of the molten glass in the said heel causes most of the molten glass in the said heel to flow in a direction substantially at right angles to the direction of advancement of the ribbon along the bath.

The transverse displacement of the molten glass in the heel may be enforced in a number of ways. Conveniently in accordance with the invention the transverse displacement may be enforced by adapting the physical shape of the walls in the neighbourhood of the delivery of the molten glass to a particular design of delivery means to ensure that the desired transverse displacement is effected in the heel, for example by shaping the wall which limits the heel or by dispensing with any walls which confine the edges of the heel.

More particularly the enforced transverse displacement of the molten glass in the heel may be effected by controlling the flow or molten glass into the heel by employing a shaped wall which projects towards the area of delivery of the molten glass to the bath, thereby confining and accelerating the flow of molten glass into the heel and directing the flow of molten glass in a direction transverse to the direction of advancement of the ribbon on the bath.

The transverse displacement which is enforced on the molten glass in the heel according to this invention may be in any of the possible directions. For example the molten glass at one side of the heel may be caused to be displaced or to flow across the whole width of the heel into the other side of the heel, or there may be enforced on the molten glass in the said heel a transverse displacement in the directions from the centre of the heel to the margins thereof whereby molten glass from the heel is incorporated in the margins of the glass ribbon.

Advantageously, the transverse displacement of the glass in the heel according to the present invention is enhanced by controlling the rate of flow of molten glass to the bath over the width of the flow of molten glass used.

According to this aspect, therefore, the present invention provides in the manufacture of flat glass in ribbon form during which the glass is advanced along a bath of molten metal, delivering molten glass to the bath at a controlled rate over a predetermined width of a delivery means, controlling the delivery of the glass to the bath to ensure a flow of a greater mass of molten glass over a selected portion of said predetermined width, advancing the molten glass along the bath in ribbon form, permitting the molten glass delivered to the bath to flow in a direction away from the advancing glass to form a heel, and utilising the said greater mass flow to enforce on the molten glass in said heel a displacement in a direction transverse to the direction of advancement of the glass ribbon along the bath, whereby most of the glass in the said heel is constrained to flow continuously into the glass ribbon and the formation of a stagnant zone in the heel is substantially avoided.

According to a preferred aspect, the present invention provides in the manufacture of flat glass in ribbon form during which the glass is advanced along a bath of molten metal, delivering molten glass to the bath at a controlled rate over a predetermined width of a delivery means, controlling the delivery of the glass to the bath to ensure a flow of a greater mass of molten glass in the central portion of the said predetermined width than in the marginal portions thereof, advancing the molten glass along the bath in ribbon form, and permitting the molten glass delivered to the bath to flow in a direction away from the advancing glass to form a heel, the greater mass flow in the said central portion enforcing on the molten glass in said heel a displacement in a direction of advancement of the glass ribbon along the bath, whereby the glass in the said heel is constrained to flow continuously into the marginal portions of the ribbon of glass and the formation of a stagnant zone in the said heel is substantially avoided.

The occurrence of a greater mass flow in one portion of the glass being delivered to the bath may be effected, for example, by imposing a thermal gradient on the molten glass flowing along a spout to the point of delivery to the bath. In a preferred arrangement, the desired thermal gradient is obtained by heating the molten glass passing along a central portion of a spout of generally rectangular cross-section, so that a greater mass flow is obtained in the central portion of the glass delivered to the bath.

Alternatively, the greater mass flow in the central portion of the glass being delivered to the bath may be effected by variation in the structural characteristics of the apparatus employed for delivery of the molten glass. According to one feature the greater mass flow in the central portion of the glass being delivered to the bath may be effected by delivery of the molten glass from a spout having a U-shaped lip, while the spout may, if desired, be inclined at an angle to the vertical. The U-shaped lip of the spout may be part of a continuous U-shaped contour (i.e. a concave surface) down an inclined portion of the spout, or alternatively the spout may have a generally rectangular cross-section at the top of the inclined portion with a gradual formation of the U-contour down the spout until there is a concave surface at the lip and the U-shaped lip is formed.

On the other hand, the greater mass flow in the central portion of the glass being delivered to the bath may be effected by providing a tweel, the lower edge of which is shaped to permit a greater flow of molten glass in a central portion of the said predetermined width, and which intersects the molten glass being delivered to the bath by a spout of generally rectangular cross-section.

According to a further aspect a method of manufacturing flat glass in ribbon form during which the glass is advanced along a bath of molten metal comprising flowing molten glass down a spout from which the molten glass falls freely to the surface of the bath so that molten glass is flowed forwardly down the bath and a reverse flow of the molten glass away from the forwardly flowing glass is permitted so that a heel of molten glass is formed under the spout, enforcing on the molten glass in said heel a displacement in a direction transverse to the direction of advancement of the glass ribbon along the bath by delivering to the central portion of the said heel a greater mass of molten glass than is delivered to the marginal portions of the heel, and permitting the glass forming the said heel to flow outwardly and become incorporated in the marginal portions of the ribbon of glass, whereby the formation of a stagnant zone in the said heel is substantially avoided.

According to a still further aspect, the present invention also comprises a method of manufacturing flat glass in ribbon form during which the glass is advanced along a bath of molten metal comprising flowing molten glass down a spout from which the molten glass falls freely to the surface of the bath so that molten glass is flowed forwardly down the bath and a reverse flow of the molten glass away from the forwardly flowing glass is permitted so that a heel of molten glass is formed under the spout, and enforcing on the molten glass in said heel a displacement in a direction transverse to the direction of advancement of the glass ribbon along the bath by delivering to the central portion of the said heel a greater mass of molten glass than is delivered to the marginal portions of the heel, whereby the glass forming the said heel is constrained to flow outwardly and become incorporated in the marginal portions of the ribbon of glass, and the formation of a stagnant zone in the said heel is substantially avoided.

The present invention additionally comprehends apparatus for manufacturing flat glass according to the method of the invention on a bath of molten metal comprising, in combination, means for producing molten glass, an adjacent tank containing a bath of molten metal, pouring means for delivering molten glass onto the bath of molten metal, said pouring means overlapping the adjacent end of the tank and being disposed in spaced relation with the plane of the intended level of the bath, and the tank comprising, on the opposite side of the pouring means to that on which the ribbon is advanced, a shaped wall having a central line which is nearer to the pouring means than any other part of the wall and similar confluent surfaces extending on each side of the said central line.

The present invention also comprehends apparatus for manufacturing flat glass according to the method of the invention on a bath of molten metal comprising, in combination, means for producing molten glass, an adjacent tank containing a bath of molten metal, pouring means for delivering molten glass onto the bath of molten metal, said pouring means overlapping the adjacent end of the tank and being disposed in spaced relation with the plane of the intended level of the bath, and including means for causing a greater mass of molten glass to flow over one portion of said pouring means than flows over the remainder thereof.

Preferably the present invention also comprehends apparatus for manufacturing flat glass according to the method of the invention on a bath of molten metal, comprising, in combination, means for producing molten glass, an adjacent tank containing a bath of molten metal, pouring means for delivering molten glass onto the bath of molten metal, said pouring means overlapping the adjacent end of the tank and being disposed in spaced relation with the plane of the intended level of the bath, and including means for causing a greater mass of molten glass to flow over a central portion of said pouring means than flows over the marginal portions thereof; and restrictor tiles in contact with the molten metal of the bath and arranged to protect the surface of the bath which is not covered by the molten glass in the heel from any access of air into the bath.

Figure 2:
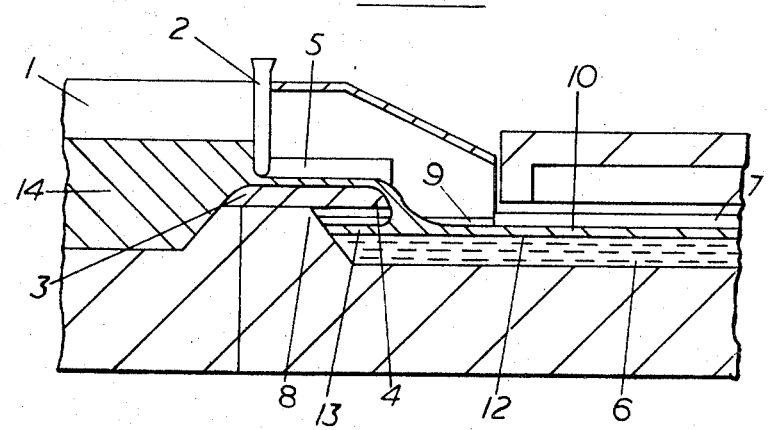
Figure 3:
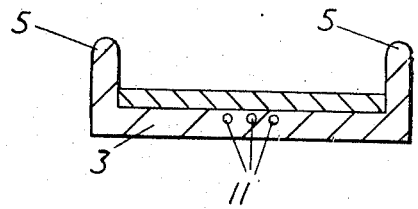
Figure 4:
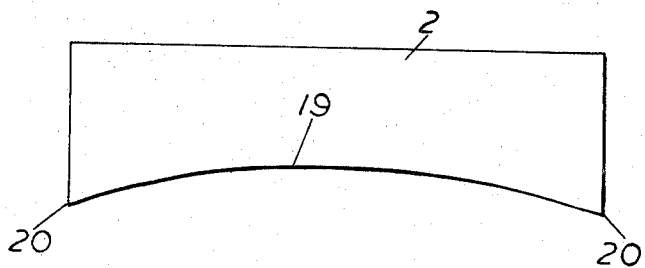
Figure 5:
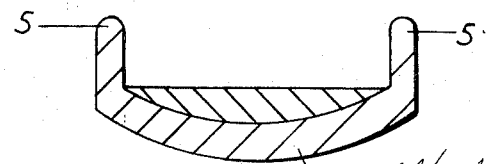
Figure 6:
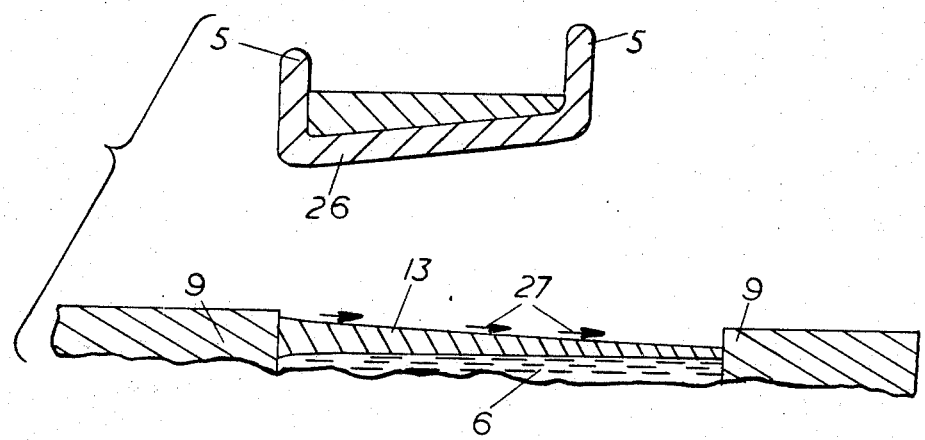
Figure 7:
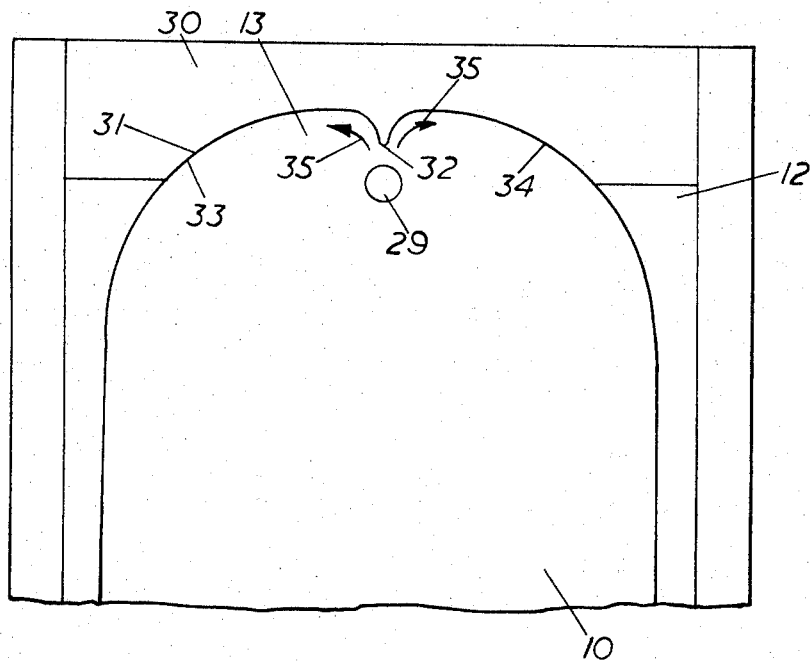

In order that the invention may be more clearly understood the following description of preferred embodiments thereof is made, purely by way of example, with reference to the accompanying diagrammatic drawings in which:

FIG. 1 is a plan view of the inlet end of a tank structure containing a bath of molten metal and showing means for delivering molten glass to the bath, FIG. 2 is a sectional elevation of the apparatus taken along the line II—II of the apparatus of FIG. 1, FIG. 3 is a cross-sectional view of the lip of the spout, which comprises the means for delivering the glass to the bath as shown in FIG. 1, taken along the line III—III of FIG. 1, FIG. 4 shows the profile of a tweel for controlling the flow of the molten glass along the spout of FIGS. 1 to 3, FIG. 5 shows a cross-sectional view, similar to that of FIG. 3, of an alternative form of spout, FIG. 6 shows an alternative arrangement of spout and restrictor tiles according to the invention and indicates the direction of movement of the molten glass in the heel on the bath, and FIG. 7 is a plan view of an embodiment of the invention in which a shaped wall is provided for enforcing the desired transverse displacement on the molten glass in the heel.

In the drawings, the same or similar parts are designated by like reference numerals.

Referring to the drawings, and more particularly to FIGS. 1 to 3, a forehearth of a continuous melting tank is indicated at 1, a regulating tweel at 2, and a pouring spout at 3, by which spout molten glass produced in the melting tank is discharge from the melting tank. The spout 3 comprises a lip 4, and side jambs 5. As shown in FIG. 3, the spout 3 is of generally rectangular cross-section.

A tank structure containing a bath 6 of molten metal comprises side walls 7 and end walls of which the end wall 8 at the inlet end is shown in the drawings. Positioned on the surface of the bath in spaced lateral relation from the position of the spout 3 are restrictor tiles 9 of refractory material.

As shown in FIG. 3, the central portion of the spout includes heating elements 11 whereby the molten glass flowing down the central portion of the refractory spout 3 may be maintained at a higher temperature than the molten glass flowing down the spout near the side jambs 5.

The vertical spacing of the lip 4 of the spout 3 from the surface 12 of the molten metal bath is of the order of a few inches, and is such as to ensure a heel 13 being formed behind the glass flowing down the spout to the bath, which heel is extended rearwardly under the spout lip 4 to the end wall 8 of the tank structure.

The tweel 2 has a lower edge intersecting the surface of the molten glass flowing down the spout 3, which lower edge is substantially horizontal.

However, in operation, a flow of a greater mass of molten glass in the central portion of the width of the spout 3 occurs due to the natural tendency of the glass at the centre to be hotter than the glass at the edges, despite the horizontal linear shape of the bottom edge of the tweel and the generally rectangular cross-section of the spout. If this natural tendency for a greater mass flow in the central portion is to be enhanced, this may be done, for example, by the use of heating elements 11 in the central part of the spout 3, or by providing radiant heaters over the central portion of the spout.

The operation of the embodiment of the apparatus according to the present invention described with reference to FIGS. 1 to 3 is that molten glass 14 from a continuous melting tank is flowed through the forehearth 1 of the melting tank, and beneath the regulating tweel 2 on to the spout 3. The molten glass 14 flowing down the spout 3 is caused to have a greater mass flow in the central part by the supply of heat to the molten glass from the heaters 11, preferably electrical heaters, in the refractory spout 3.

Of the molten glass delivered to the bath 6 of molten metal, the main body of the glass flows forwardly along the bath to form the ultimate ribbon 10 of glass. However, molten glass will also flow backwardly to form the heel 13, and the greater mass of molten glass delivered to the central portion of the bath ensures that a transverse displacement of the molten glass in the heel is enforced, so that no stagnant zone of molten glass can exist in the heel 13. In the embodiment described the transverse displacement is such that a continuous lateral flow of the molten glass from the heel 13 is effected so that the molten glass from the heel 13 flows continuously outwardly to the restrictor tiles 9, and the path taken by the molten glass from the heel 13 is indicated by the arrows 15 and 16 on FIG. 1 of the drawings. The molten glass from the heel 13 is thus incorporated in the marginal portions of the ribbon of glass formed further down the molten metal bath 6.

The restrictor tiles 9 are spaced laterally from the position of the spout 3 over the molten metal bath 6 in order to permit the lateral flow of the molten glass in the heel 13. The actual lateral spacing employed depends on the load of glass supplied to the bath from the spout, but for an average load it is found that a lateral spacing of the order of several inches enhances the lateral flow of the molten glass in the heel 13. However a very strong lateral flow of the molten glass is obtained when the greater mass flow of the molten glass down the centre of the width of the spout is used during the delivery of the molten glass to the bath.

As an alternative to the promotion of a greater central mass flow of the molten glass 14 by the heating means described with reference to FIG. 3, it is possible to alter the shape of the elements used to deliver the molten glass 14 to the bath 6. In the case where the spout 3 is of generally rectangular cross-section, as indicated in FIG. 3, the tweel may have an alternative shape, such as that shown for example in FIG. 4 of the accompanying drawings. The lower edge of the tweel 2 of FIG. 4 is formed to have an inverted U-shape so that a central part 19 of the lower edge of the tweel 2 is of lesser depth than the margins of the tweel. Thus a greater flow of molten glass will be permitted beneath the central portion 19 of the tweel 2, and consequently a greater flow of molten glass over the central portion of the spout 3 will be obtained.

The same effect may be obtained by using a tweel 2 having a lower edge with a modified version of the U-shape shown in FIG. 4.

As an alternative to varying the shape of the lower edge of the tweel 2 in order to obtain a greater mass flow of molten glass down the central portion of the spout 3, the spout itself may be shaped in order to have a lip with a concave surface, so that a greater passage of molten glass at the centre of the spout is engendered. An alternative form of spout 23, having a U-shaped lip 24, is shown in FIG. 5 of the drawings. When the spout having a U-shaped lip is used, the distance between the lip of the spout and the wall of the tank or tile which limits the quantity of molten glass in the heel is less in the central part of the spout than in the marginal parts, so that a stronger transverse flow of molten glass at the central portion of the heel is produced.

In FIG. 6 of the accompanying drawings there is shown diagrammatically an alternative arrangement in which the lateral flow which is enforced on the molten glass in the heel is a flow from one side of the heel to the other. FIG. 6 is a sectional view taken along a line, intersecting the heel behind the point of delivery of the molten glass to the bath.

A spout 26 having an inclined lip delivers to the molten bath 6 a greater mass of molten glass at one side of the spout than at the other side, i.e. a greater mass of molten glass is delivered from the left-hand side of the spout than from the right-hand side as seen in FIG. 6. The restrictor tiles 9 on the bath 6 are positioned with the left-hand tile 9 close in beneath the spout 26 and the right-hand tile 9 spaced away from its corresponding side of the spout 26, so that there is enforced on the molten glass in the heel 13 by the greater mass flow of molten glass from the spout 26 and the positioning of the restrictor tiles 9, a transverse displacement from left to right as indicated by the arrows 27. The enforced transverse displacement of the molten glass in the heel 13 gives rise to a continuous flow of molten glass in the heel 13 in a direction at right angles to the direction of advancement of the ribbon, so that the presence of any stagnant zone in the heel 13 of molten glass is substantially avoided by the continual escape of molten glass from the right-hand side of the heel 13.

Referring now to FIG. 7 of the accompanying drawings there is shown, in plan view, an arrangement in which the molten glass is delivered to the surface 12 of the molten metal bath over a circular area denoted by the reference numeral 29, for example by a circular tube. In addition to flowing down the bath to form the ribbon 10, the molten glass flows in a direction away from the advancing glass to form a heel 13 behind the area of delivery 29. The end tile 30 of the tank structure is shaped to provide a wall 31 which has a central line 32 which is nearer to the area of delivery than is any other part of the wall 31. The wall 31 has similar confluent surfaces 33 and 34 extending on either side of the central line 32, and the shape of the wall 31 enforces on the molten glass entering the heel 13 a transverse displacement as indicated by the arrows 35.

The tile 30 of FIG. 7 combines the function of the end wall 8 and the restrictor tiles 9 of FIG. 1.

In the embodiments of the invention described, the size of the heel 13 is limited by the position of the lip 4 of the spout 3 in relation to the end wall 8 or 31 of the tank structure. Optionally, however, a wet-back tile may be provided to control the temperature of the glass in the heel by limiting the distance between the position of the lip and the limiting wall behind the spout. It will be appreciated that the presence of a wet-back tile is not essential, as the combination of the spout and tank structure may be constructed to give any desired distance in which the heel 13 of molten glass may be formed.

The actual size of the heel 13 used, that is to say the distance between a vertical plane through the front of the lip of the spout and the vertical plane of the end wall or wet-back tile which restricts the flow of the molten glass away from the ribbon, should be sufficient to permit of a substantial flow of molten glass in the heel 13. The size of the heel 13 is chosen in any particular case according to the conditions of operation of the bath, but for an average load it is found that a heel size of the order of several inches permits the desired movement of the molten glass in the heel to avoid the formation of any stagnant zone from which molten glass in the heel does not escape.

As an alternative to the formation of a heel of a definite size, however, molten glass may be taken away from the heel continuously in a direction away from the direction of advancement of the ribbon of glass on the bath. In effect this alternative method of operation permits the continuous escape of glass from the heel by drawing off a ribbon of glass in the opposite direction to the direction of advancement of the ribbon on the bath. The second ribbon obtained from the heel by this alternative method will not have the quality of the ribbon formed on the bath of molten metal.

By the use of the arrangements described and illustrated, I obtain the advantage that the possibility of devitrification occurring in the molten glass in the heel is eliminated.

I claim:

1. Apparatus for use in the manufacture of flat glass, comprising a furnace for producing molten glass, an adjacent tank structure containing a bath of molten metal, glass pouring means forwardly spaced along the bath from the inlet end wall of the tank structure and spaced above the surface level of the bath to provide for the formation of a heel of molten glass on the bath between said pouring means and the inlet end wall, a forehearth extending between the furnace and the pouring means, and glass flow regulating wall means associated with said pouring means and providing a flow surface for the glass of the heel which surface extends rearwardly and outwardly from said pouring means and then outwardly and forwardly for causing a laterally-directed flow of glass away from a portion of the heel of molten glass whereby the formation of a stagnant zone in the heel is prevented.

2. Apparatus for manufacturing flat glass comprising a tank structure containing a bath of molten metal, pouring means including a lip for delivering molten glass from a forehearth of a glass melting furnace on to the bath of molten metal, said pouring means overlapping the end of the tank structure adjacent the furnace and being disposed in spaced relation with the plane of the intended surface level of the bath, and means for concentrating the glas flow in one portion of the width of said lip to cause a greater mass of molten glass to flow over one area of said lip than flows over the remainder thereof.

3. Apparatus for manufacturing flat glass comprising, in combination, a glass melting furnace, an adjacent tank structure containing a bath of molten metal, a forehearth extending from the furnace, a spout terminating said forehearth and overlapping the end of the tank structure adjacent the furnace, the spout being disposed in spaced relation with the plane of the intended surface level of the molten metal bath, and glass flow defining means in the form of a spout floor or tweel having a concavity therein for causing a greater mass flow of molten glass over the central region of the width of the spout than over the marginal regions of the spout.

4. Apparatus for the manufacture of flat glass in ribbon form by advancing the glass along a bath of molten metal, which comprises an end wall element at the inlet end of the bath, a spout element overhanging said end wall and arranged to deliver glass to the surface of said bath forwardly of said end wall so that part of the glass can move forwardly to form part of said ribbon and part of the glass can move rearwardly to form a heel, and a distortion in at least one of said wall and spout elements at one portion of the width thereof for enforcing a greater mass flow in one area of said heel than in other areas thereof, thereby causing a displacement of molten glass in the heel which causes continuously a sufficient escape of molten glass from the heel to avoid the establishment of a stagnant zone in the heel of molten glass.

5. Apparatus as in claim 2 wherein said concentrating means is in the form of heating elements disposed in association with said one portion.

6. Apparatus as in claim 2 wherein said concentrating means is in the form of a depression in the floor at said one portion of the pouring means.

7. Apparatus as in claim 2 wherein said concentrating means is in the form of a tweel having a lower edge which is higher at said one portion than elsewhere along the width thereof.

8. Apparatus for use in the manufacture of flat glass, comprising a furnace for producing molten glass, an adjacent tank structure containing a bath of molten metal, glass pouring means forwardly spaced along the bath from the inlet end wall of the tank structure and spaced above the surface level of the bath to provide for the formation of a heel of molten glass on the bath between said pouring means and the inlet end wall, a forehearth extending between the furnace and the pouring means, and glass flow regulating wall means associated with said pouring means and providing a flow surface for the glass of the heel which surface is constituted by a shaped inner face of the inlet wall of the tank structure which shaped face has a central area which extends directly forwardly towards the flow from the pouring means to divide the flow at the heel and which is nearer to the pouring means than any other part of the face, and receding concave surfaces extending first rearwardly and outwardly and then outwardly and then forwardly on each side of said central area.

9. Apparatus for manufacturing flat glass comprising in combination a glass melting furnace, an adajcent tank structure containing a bath of molten metal, a forehearth extending from the furnace, a spout of rectangular form in cross-section terminating said forehearth and overlapping the end of the tank structure adjacent the furnace, the spout being disposed in spaced relation with the plane of the intended surface level of the molten metal bath, and heating elements incorporated within a central region of the floor of the spout for causing a greater mass flow of molten glass over the central region of the width of the spout than over the marginal regions of the spout.

10. Apparatus for manufacturing flat glass comprising in combination a glass melting furnace, an adjacent tank structure containing a bath of molten metal, a forehearth extending from the furnace, a spout the floor of which is U-shaped in cross-section terminating said forehearth and overlapping the end of the tank structure adjacent the furnace, the spout being disposed in spaced relation with the plane of the intended surface level of the molten metal bath, the U-shaped cross-section of the spout for causing a greater mass flow of molten glass over the central region of the spout than over the marginal regions.

11. Apparatus for manufacturing flat glass comprising in combination a glass melting furnace, an adjacent tank structure containing a bath of molten metal, a forehearth extending from the furnace, a spout of rectangular form in cross-section terminating said forehearth and overlapping the end of the tank structure adjacent the furnace, the spout being disposed in spaced relation with the plane of the intended surface level of the molten metal bath, and a tweel whose lower edge is of concave form associated with the spout and arranged to intersect molten glass flowing along the spout for causing a greater mass flow of molten glass over the central region of the width of the spout than over the marginal regions of the spout.

References Cited
UNITED STATES PATENTS

| | | | |
|---|---|---|---|
| 3,083,551 | 5/1963 | Pilkington | 65—65 X |
| 3,264,081 | 8/1966 | Pilkington | 65—182 |

DONALL H. SYLVESTER, *Primary Examiner.*

A. D. KELLOGG, *Assistant Examiner.*